(12) United States Patent
Sluijs et al.

(10) Patent No.: US 6,677,733 B2
(45) Date of Patent: Jan. 13, 2004

(54) SINGLE REFERENCE DC/DC CONVERTER

(75) Inventors: Ferdinand Jacob Sluijs, Eindhoven (NL); Dirk Wouter Johannes Groeneveld, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/056,372

(22) Filed: Jan. 17, 2002

(65) Prior Publication Data

US 2002/0113579 A1 Aug. 22, 2002

(30) Foreign Application Priority Data

Jan. 18, 2001 (EP) .............................. 01200170

(51) Int. Cl.[7] .............................. G05F 1/10; G05F 1/652
(52) U.S. Cl. .......................... 323/222; 323/282; 323/285
(58) Field of Search .............................. 323/222, 220, 323/282, 285, 288

(56) References Cited

U.S. PATENT DOCUMENTS

| 5,625,279 | A |   | 4/1997 | Rice et al. ................. 323/283 |
|---|---|---|---|---|
| 5,914,865 | A |   | 6/1999 | Barbehenn et al. ........... 363/21 |
| 6,265,854 | B1 | * | 7/2001 | Neuteboom ................. 323/222 |
| 6,275,014 | B1 | * | 8/2001 | Sudo ......................... 323/222 |
| 6,348,779 | B1 | * | 2/2002 | Sluijs ........................ 323/222 |
| 6,348,781 | B1 | * | 2/2002 | Midya et al. ................ 323/222 |
| 6,356,063 | B1 | * | 3/2002 | Brooks ....................... 323/284 |
| 6,366,070 | B1 | * | 4/2002 | Cooke et al. ............... 323/222 |
| 6,369,551 | B1 | * | 4/2002 | Blumenkrantz et al. .... 323/222 |
| 6,452,368 | B1 | * | 9/2002 | Basso et al. ................ 323/282 |

FOREIGN PATENT DOCUMENTS

| WO |   | 9534121 A1 | 12/1995 |   |
|---|---|---|---|---|
| WO |   | WO9844622 | 3/1998 | .......... H02M/3/157 |

* cited by examiner

*Primary Examiner*—Bao Q. Vu
(74) *Attorney, Agent, or Firm*—Steven R. Biren

(57) ABSTRACT

A DC/DC converter (1), comprising inductive electrical energy storage means (L), switching means (S1, S2) and control means (6).

The control means (6) are arranged for selectively operating the switching means (S1, S2) for transferring an amount of electrical energy from the energy storage means (L) to an output of the DC/DC converter (1), for providing a desired output voltage (Vout), in accordance with a two-state switching cycle comprising a minimum and a maximum duty cycle (Dmin, Dmax).

12 Claims, 2 Drawing Sheets

SINGLE REFERENCE DC/DC CONVERTER

BACKGROUND AND SUMMARY OF THE INVENTION

The present invention relates to a DC/DC converter, comprising inductive electrical energy storage means, switching means and control means, wherein the control means are arranged for selectively operating the switching means for transferring an amount of electrical energy from the energy storage means to an output of the DC/DC converter, for providing a desired output voltage.

A DC/DC converter of this type is known from International patent application WO95/34121 in the name of applicant.

In practice, a DC/DC converter of the above type can be operated in a continuous or PWM (Pulse Width Modulation) mode, wherein electrical energy is continuously stored in the energy storage means, or in a discontinuous or PFM (Pulse Frequency Modulation) mode, wherein the energy storage means may become completely discharged.

In a single output DC/DC converter operated in PWM mode, a typical switching cycle comprises a first phase wherein energy is stored in the energy storage means and a second phase wherein energy is transferred from the energy storage means to the output of the converter. The output power of a DC/DC converter operated in PWM mode is controlled by its duty cycle, which is the ratio of the length of the first phase and the total length of the switching cycle, i.e. the sum of the first and second phases.

For controlling the output voltage of the known DC/DC converter a voltage window is required, comprising an upper output voltage reference level and a lower output voltage reference level. Controlling the output voltage using such a voltage window, causes a random low frequency ripple in the output voltage and, of course, a spread in the output voltage. These effects can be reduced by reducing the voltage window, however this reduction is limited due to process spreading in voltage comparators used.

The size of the ripple is directly related to the current by which the energy storage means are charged and discharged, and relates directly to the duty cycle with which the converter is operated. A high duty cycle, implying that a relatively large amount of electrical energy is stored in the energy storage means and discharged therefrom, increases the current and thereby the output ripple, whereas a low duty cycle, implying less energy transfer, decreases the current and, accordingly, the low frequency ripple at the output voltage. A relatively high voltage drop in the output voltage occurs during the second phase of the switching cycle, if the energy storage means are discharged with a relatively high current. When the output voltage, for control purposes, is measured during this second phase, the duty cycle and the discharge current will have a direct negative influence on the accuracy of the measurement.

It is an object of the present invention to provide a DC/DC converter of the above-mentioned type, using a single voltage reference level for controlling the output voltage, thereby reducing the dependency of the voltage measurement on the ripple voltage.

This object is solved in a DC/DC converter according to the present invention, in that the control means are configured for operatively controlling the switching means for transferring electrical energy in accordance with a two-state switching cycle comprising a minimum and a maximum duty cycle.

The present invention is based on the insight that, while the output voltage is above its desired value, set by a reference voltage, the converter is not so heavily loaded, such that during the subsequent switching cycle less energy has to be transferred to the energy storage means, thereby reducing the voltage ripple at the output voltage as disclosed above. Only, in the case that the output voltage drops below its desired value, a greater amount of electrical energy has to be stored in the energy storage means during the subsequent switching cycle, in order to restore the output voltage at its required level. As a result, the overall voltage ripple is reduced while the control means can be of a relatively simple design, using a single reference voltage and a two-state duty cycle control, providing a very stable control of the converter.

In a preferred embodiment of the invention, the DC/DC converter comprises:
- first and second input terminals for receiving an input voltage Vin;
- first and second output terminals for providing an output voltage Vout;
- a coil, having first and second connection ends, wherein the first connection end connects to the first input terminal;
- first switching means operatively connected to provide a conduction path from the second connection end of the coil to the second input terminal;
- second switching means operatively connected to provide a conduction path from the second connection end of the coil to the first output terminal;
- diode means, parallel connected to the second switching means, and providing a conduction path from the second connection end of the coil to the first output terminal;
- capacitor means connected between the first and second output terminals;
- control means arranged for operatively switching the first and second switching means into their closed or conductive state and their open or non-conductive state, and
- comparator means, configured for comparing the output voltage Vout with a reference voltage Vref for providing a control signal to the control means for switching the switching means in accordance with the minimum and maximum duty cycle.

Preferably, switching means constructed as MOS (Metallic Oxide Semiconductor) transistor means are used, having their control terminal (gate) connected with the control means for controlling the conductive or non-conductive state of the transistors.

The DC/DC converter according to the invention is of particular advantage if applied in a portable electronic appliance, such as but not limit to battery powered appliances.

BRIEF DESCRIPTION OF THE DRAWINGS

The invention will now be described in more detail with reference to the accompanying drawings showing, as an exemplary embodiment, a DC/DC up-converter, wherein.

DETAILED DESCRIPTION OF THE PREFERRED EMBODIMENT

Figure 1:
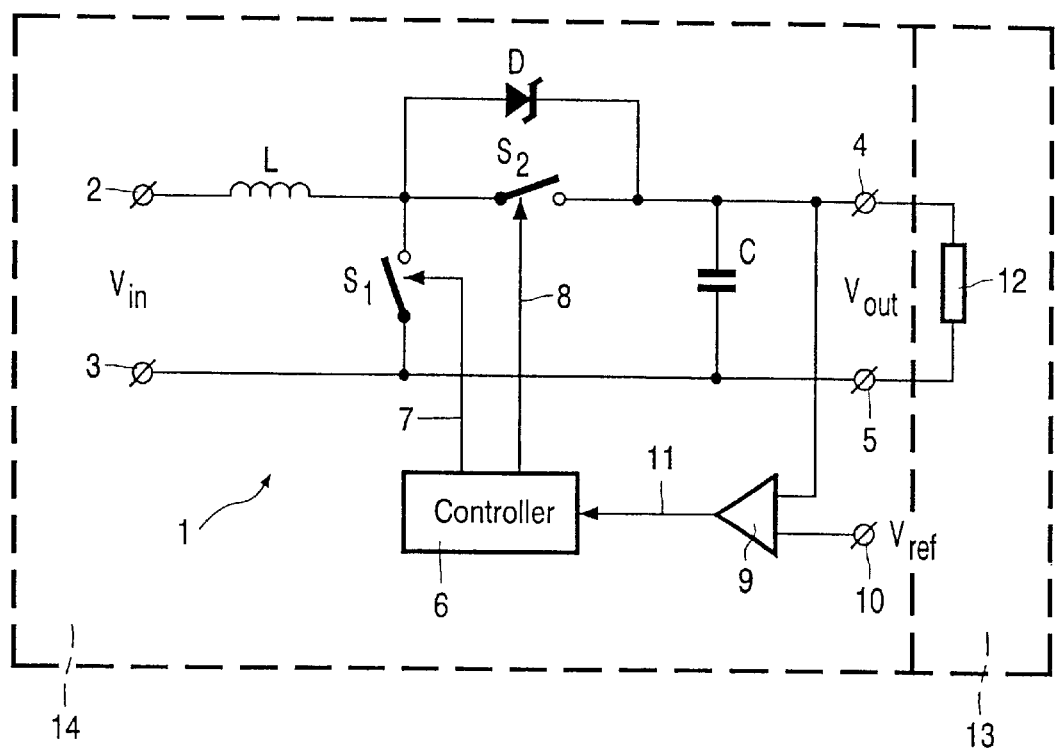
FIG. 1 shows a circuit diagram of a single output DC/DC up-converter in accordance with the present invention.

FIG. 1 shows a DC/DC up-converter 1 operated in accordance with the present invention, and having a single output.

The converter 1 comprises inductive electrical energy storage means taking the form of a coil L and first switching means S1, series connected between a first input terminal 2 and a second input terminal 3. The connection of the coil L and the first switching means S1 connects via second switching means S2 to a first output terminal 4. A diode D is parallel connected with the second switching means S2 and provides a current conductive path from the first input terminal 2 to the first output terminal 4. The second input terminal 3 and a second output terminal 5 connect through a common conductive path, for example the earth or mass of an electronic appliance. A smoothing capacitor C connects between the first and second output terminals 4, 5.

The converter 1 is operated to provide a controlled or regulated output voltage Vout at the output terminals 4, 5 in response to an input voltage Vin at the input terminals 2, 3. To this end, a controller or control means 6 are provided for operating the first and second switching means S1 and S2 in accordance with a switching sequence, wherein the output voltage Vout is higher than the input voltage Vin. The control of the first and second switching means S1 and S2 is schematically indicated by arrows 7, 8, respectively.

Comparator means 9 are provided, for comparing the output voltage Vout with a single reference voltage Vref provided at an input terminal 10 of the comparator means 9. An output of the comparator means 9 connects to an input of the control means 6, as schematically indicated by arrow 11.

Figure 2:
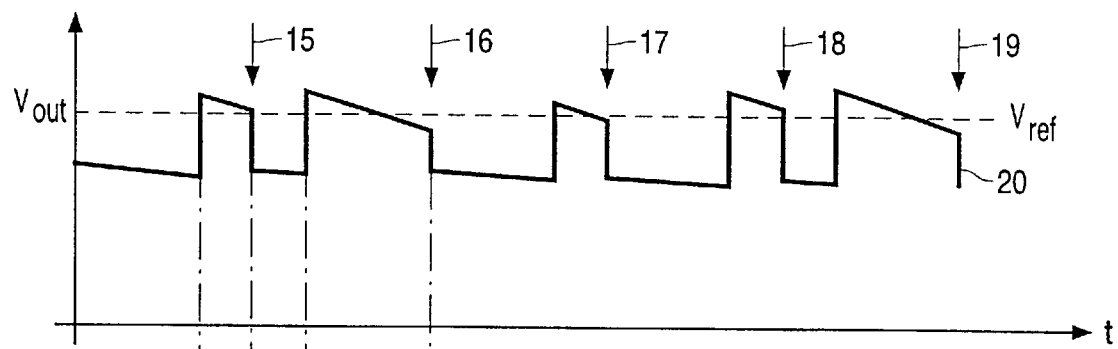
FIG. 2 shows, in a graphic representation, the output voltage at the output of the DC/DC up-converter shown in FIG. 1.
Figure 3:
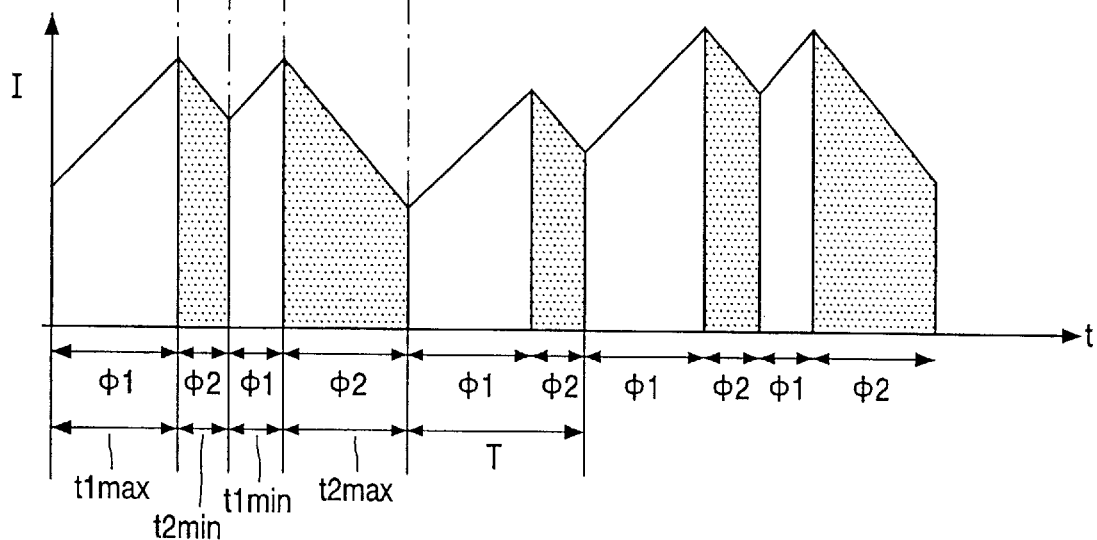
FIG. 3 shows, in a graphic representation, current flow in the inductive energy storage means in the DC/DC up-converter shown in FIG. 1.

FIG. 3 shows the coil current I against the time t in a typical switching cycle in a Pulse Width Modulation (PWM) conversion, wherein the current I through the coil L does not become zero. During a first phase Φ I energy is stored or built up in the coil L, whereas in a second phase Φ2 of the PWM switching cycle the stored energy is delivered the output terminals 4, 5 of the converter 1. In the first phase Φ1, the first switching means S1 are closed, that is in a current conductive state, while the second switching means S2 are open, that is in a non-current conductive state. During the first phase Φ1 current flows only through the coil L storing electrical energy therein. During this phase, the current I through the coil L increases. In the second phase Φ2 the first switching means S1 are open and the second switching means S2 are closed. In this phase, the current I through the coil L drops because energy is delivered to a load 12 connected across the output terminals 4,5 of the converter 1. This results in a ripple 20 in the output voltage Vout, as shown in FIG. 2, the frequency of which equals the switching frequency of the converter 1.

The ripple 20 in the output voltage is also caused by the charging and uncharging of the output capacitor C and the current through the equivalent series resistance (ESR) of this capacitor C. The size of the ripple 20 is directly related to the coil current I, which is controlled by the duty cycle of the converter 1.

The duty cycle D is defined as:

$$D = t1/(t1+t2) = t1/T$$

wherein:
- t1=the length in time of the first phase Φ1 wherein the first switching means S1 are closed;
- t2=the length in time of the second phase Φ2 wherein the second switching means S2 are closed, and $$T = t1 + t2.$$

In accordance with the present invention, the control means 6 are arranged for switching the first and second switching means S1 en S2 following a two-state duty cycle, having a minimum value Dmin and a maximum value Dmax, defined by:

$$Dmax = t1max/(t1max + t2min)$$

wherein:
- t1max=maximum length in time of t1, and
- t2min=minimum length in time of t2;
- Dmin=t1min/(t1min+t2 max)

wherein:
- t1min=minimum length in time of t1, and
- t2max=maximum length in time of t2, wherein:

$$T = t1max + t2min = t1min + t2max.$$

As shown in FIG. 2, the output voltage Vout is measured at sample moments at the end of a conversion cycle (t=T), as indicated by arrows 15, 16, 17, 18, 19. In accordance with the present invention, if at a sample moment the output voltage Vout is above the reference level Vref, such as at the sample moments 15 and 18, the subsequence switching cycle will have the minimum duty cycle Dmin. If the output voltage Vout, at the sample moment, drops below the reference voltage Vref, such as indicated at the sample moments 16, 17 and 19, the subsequent switching cycle will have the maximum duty cycle Dmax.

Accordingly, by controlling the switching means in accordance with the present invention in a two-state cycle, a single reference level Vref can be applied for controlling the output voltage Vout.

Figure 4:
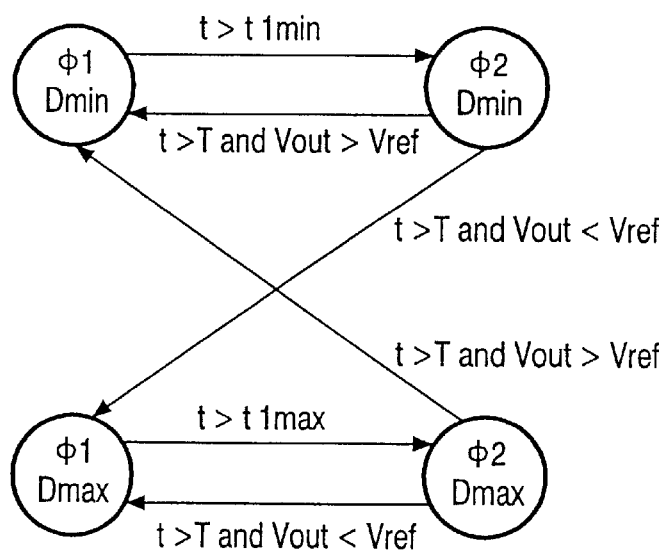
FIG. 4 shows, in a mode state diagram, a switching sequence in accordance with the invention for the DC/DC up-converter shown in FIG. 1 operated in PWM mode.

FIG. 4 shows a state diagram illustrating the operation of the single reference DC/DC converter control means 6 in accordance with the present invention.

Starting from state Φ1 of the maximum duty cycle Dmax, than if the time t during a cycle is above t1 max, the switching means S1 and S2 are switched to state Φ2 of the conversion cycle with maximum duty cycle, i.e. state Φ2, Dmax in the diagram. If at the end of the duty cycle, i.e. t>T de output voltage Vout is less then the reference voltage Vref, i.e. Vout<Vref, the control means 6 remain in the conversion cycle with maximum duty cycle Dmax.

Likewise, if the control means 6 operate in a conversion cycle with minimum duty cycle, i.e. state Φ1, Dmin and if t>t1min, the switching means S1 and S2 are switched into state Φ2, wherein energy is transferred to the output of the converter 1. At the end of the duty cycle, i.e. t>T and if Vout>Vref, the converter remains in its conversion cycle with minimum duty cycle Dmin.

If the output voltage Vout<Vref at the end of a conversion cycle, i.e. t>T, then the control means will switch from the state Φ2 with minimum duty cycle Dmin to the state Φ1 of the conversion cycle with maximum duty cycle Dmax. On the other hand, if t>T and Vout>Vref, the control means 6 will change from the state Φ2 of the conversion cycle with maximum duty cycle Dmax to the state Φ1 of the conversion cycle with minimum duty cycle Dmin.

In the DC/DC up-converter shown in FIG. 1, the second switching means S2 are optional, and are used to increase the power conversion efficiency of the DC/DC converter 1.

The DC/DC converter operating in accordance with the principles of the present invention may be used with or in an electronic appliance, such as a portable electronic appliance 13, or arranged to form a separate power supply 14, both schematically indicated by dashed lines in FIG. 1.

What is claimed is:

1. A DC/DC converter (1), comprising inductive electrical energy storage means (L), switching means (S1, S2) and control means (6), wherein said control means (6) are arranged for selectively operating said switching means (S1, S2) for transferring an amount of electrical energy from said energy storage means (L) to an output of said DC/DC converter (1), for providing a desired output voltage (Vout), characterized in that said control means (6) are configured for operatively controlling said switching means (S1, S2) for transferring electrical energy in accordance with a two-state switching cycle comprising a minimum and a maximum duty cycle (Dmin, Dmax) in response to a comparison between said output voltage (Vout) and a set reference voltage (Vref), wherein said switching means (S1, S2) are controlled such that if said output voltage (Vout) is below said set reference voltage (Vref), the maximum duty cycle (Dmax) is used for the next switching cycle, and if said output voltage (Vout) is higher than said set reference voltage (Vref) the minimum duty cycle (Dmin) is used for the next switching cycle.

2. A DC/DC converter (1) according to claim 1, wherein said comparison is made in a comparator means (9).

3. A DC/DC converter (1) according to claim 1, wherein said control means (6) are arranged for controlling said output voltage (Vout) in a Pulse Width Modulation (PWM) mode switching cycle.

4. A DC/DC converter (1) according to claim 1, comprising:

first and second input terminals (2,3) for receiving an input voltage Vin;

first and second output terminals (4, 5) for providing an output voltage Vout;

first switching means (S1) operatively connected to provide a conduction path from said second connection end of said coil (L) to said second input terminal (3);

second switching means (S2) operatively connected to provide a conduction path from said second connection end of said coil (L) to said first output terminal (4);

diode means (D) parallel connected to said second switching means (S2), and providing a conduction path from said second connection end of said coil (L) to said first output terminal (4);

capacitor means (C) connected between said first and second output terminals (4, 5);

control means (6) arranged for operatively switching said first and second switching means (S1, S2) into their closed or conductive state and their open or non-conductive state, and comparator means (9), configured for comparing said output voltage (Vout) with a reference voltage (Vref) for providing a control signal to said control means (6) for switching said switching means (S1, S2) in accordance with said minimum and maximum duty cycle (Dmin, Dmax).

5. A DC/DC converter (1) according to claim 2, wherein said switching means (S1, S2) comprise semiconductor switching means, in particular MOS (Metallic Oxide Semiconductor) transistor means.

6. A DC/DC converter (1) according to claim 1, wherein said control means (6) are configured for operating in an up-conversion mode providing an output voltage (Vout) at its output terminals (4, 5) which is higher than an input voltage (Vin) at its input terminals (2, 3).

7. A power supply (14) comprising a DC/DC converter (1) according to claim 1.

8. A portable electronic appliance (13) comprising a DC/DC converter (1) according to claim 1.

9. A DC/DC converter (1) according to claim 1 wherein said switching means (S1, S2) comprises first switching means (S1) and second switching means (S2) that are controlled to operate in complementary cyclical sequence.

10. A method for operating the DC/DC converter as described in claim 1, wherein said comparator means measures said output voltage at defined sample moments at the end of a conversion cycle.

11. The method of claim 10, wherein said comparator transmits a switching signal to said control means for initiating a minimum duty cycle if it is determined that said output voltage exceeds said reference voltage.

12. The method of claim 10, wherein said comparator transmits a switching signal to said control means for initiating a maximum duty cycle if it is determined that said reference voltage exceeds said output voltage.

* * * * *